United States Patent [19]

Hardin

[11] 4,125,048
[45] Nov. 14, 1978

[54] HITCH PIN

[76] Inventor: Russell W. Hardin, Rte. 1, Box 136, Greenfield, Ind. 46140

[21] Appl. No.: 831,783

[22] Filed: Sep. 9, 1977

[51] Int. Cl.² .......................................... F16B 21/00
[52] U.S. Cl. ............................. 85/3 R; 24/211 R; 24/212; 85/5 CP
[58] Field of Search ............. 85/5 CP, 5 N, 5 E, 5 M, 85/5 B, 3 R, 3 K, 3 S; 280/515, 507; 215/359; 24/212, 211 R, 211 P, 211 N, 97

[56] References Cited

U.S. PATENT DOCUMENTS

| 401,659 | 4/1889 | Remington | 85/3 R |
|---|---|---|---|
| 939,921 | 11/1909 | Moeller | 85/3 S |
| 1,269,912 | 6/1918 | Dunham | 85/3 R |
| 1,516,347 | 11/1924 | Pataky | 85/3 R |
| 1,974,966 | 9/1934 | McClure | 85/3 S |
| 2,161,390 | 6/1939 | Schmalstieg | 85/3 R |
| 2,377,086 | 5/1945 | Lang | 85/3 R |
| 2,782,672 | 2/1957 | Davis | 85/5 CP |
| 2,786,383 | 3/1957 | Bachman | 85/5 CP |
| 2,898,797 | 8/1959 | Bronstein | 85/5 B |
| 3,081,663 | 3/1963 | Davis | 85/5 CP |

FOREIGN PATENT DOCUMENTS

| 878,039 | 1/1943 | France | 280/515 |
|---|---|---|---|
| 431,061 | 2/1948 | Italy | 280/515 |
| 250,663 | 4/1926 | United Kingdom | 280/515 |

Primary Examiner—Rodney H. Bonck
Attorney, Agent, or Firm—Woodard, Weikart, Emhardt & Naughton

[57] ABSTRACT

Disclosed is a hitch pin formed by a tubular body having a central, longitudinal slot adjacent its tapered, lower end. An elongated locking member is pivotally supported intermediate its ends within the slot and is movable between a retracted position in which the locking member is within the slot and a locking position in which the free end portions of the member extend sidewardly beyond the slot. A rod, pivotally attached to the locking member, extends through the central bore of the tubular body and at its upper end is formed into a camming loop which recedes into a slot in the upper end of the body when the locking member is in locking position. A loop handle, having a transverse member extending through the camming loop functions to move the rod and thus the locking member between its positions when the handle is moved from alignment with, to either side of, the pin body.

1 Claim, 3 Drawing Figures

HITCH PIN

BACKGROUND OF THE INVENTION

Hitch pins of the general type described are widely used in securing farm implements to tractors, trailers to towing vehicles and in general wherever two objects are to be temporarily joined by means of a hitch. Conventionally, the hitch components are a clevis having aligned openings in its legs and a tongue having an opening drawn into registry with the clevis openings. A hitch pin is dropped through the openings and then locked against withdrawal by means of an integral locking member or by use of a spring clip or cotter-key. In farm applications and in over-the-road towing hitch pins are subject to rough usage and pins in which the locking handle extends atop the operating rod are vulnerable to damage and accidental displacement to unlocked position.

The hitch pin of the present invention overcomes these difficulties by providing a camming arrangement between a handle and the operating rod which assures that the handle is down below the upper tip or profile of the pin, and thus not vulnerable to shearing or accidental displacement when the pin is in locking condition. Improved durability results from the operating handle being attached to the body of the pin rather than to the central operating rod and the component parts of the pin assembly are easily formed and relatively simple to assemble. There are no spring clips or cotter-keys to handle, often lost or misplaced, in applying the hitch pin and a one-step simple flip of the handle to either side of the pin shank places the pin in locking condition.

DESCRIPTION OF THE PREFERRED EMBODIMENT

Figure 1:
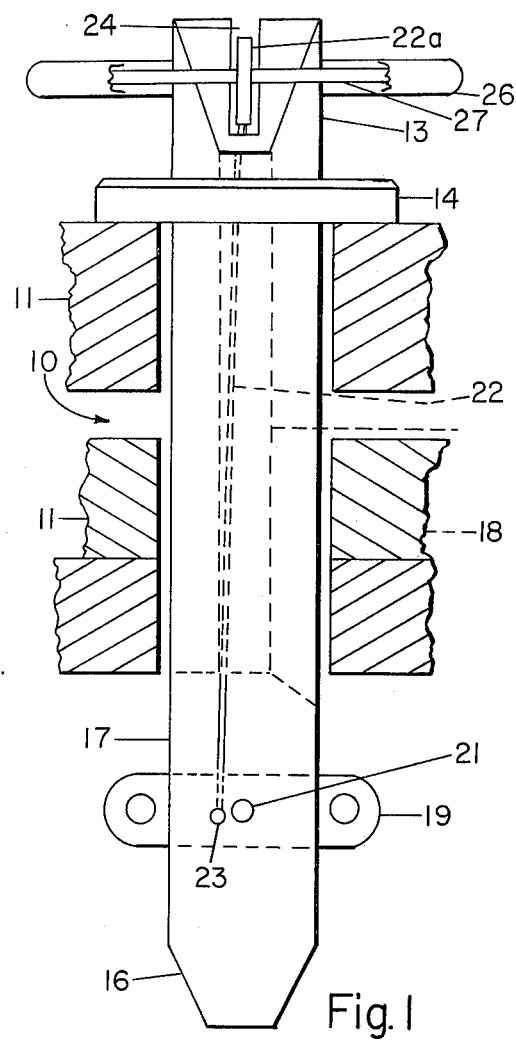
FIG. 1 is a front view of a hitch pin embodying the present invention with a portion of the handle broken away and the hitch clevis and tongue shown only in fragmentary section.

Referring to the drawings, the hitch pin of the present invention, generally indicated at 10, is shown inserted through registering apertures in the legs 11 of a conventional clevis and tongue 12.

The pin assembly includes a tubular body 13 carrying an external shoulder or flange 14 which is adapted to rest atop the upper surface of clevis leg 11. The lower end 16 of the pin body is tapered to facilitate its insertion into the tongue and clevis apertures. Adjacent its tapered, lower end the pin is provided with a central vertical slot 17 which intersects the central bore 18 of the tubular body of the pin.

An elongated locking member 19 is pivotally supported at 21 intermediate its ends within slot 17. The member 19 is movable between a retracted position (FIG. 3) in which it is totally within slot 17 and a locking position (FIG. 1) in which the end portions of the member 19 extend beyond the slot. As may best be seen in FIG. 3, a stop abutment 20 halts the motion of the member 19 when it reaches upright position.

Figure 2:
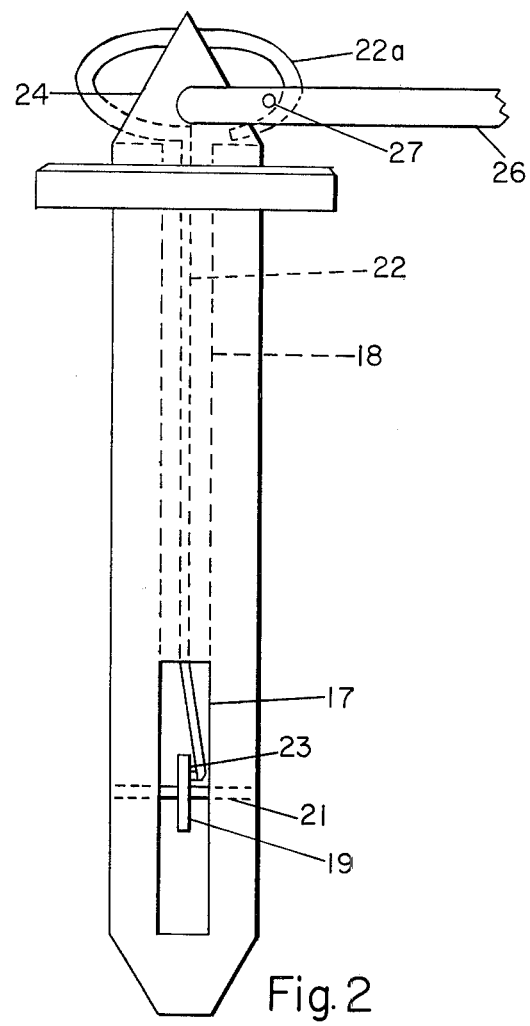
FIG. 2 is a side view of the hitch pin shown in FIG. 1.
Figure 3:
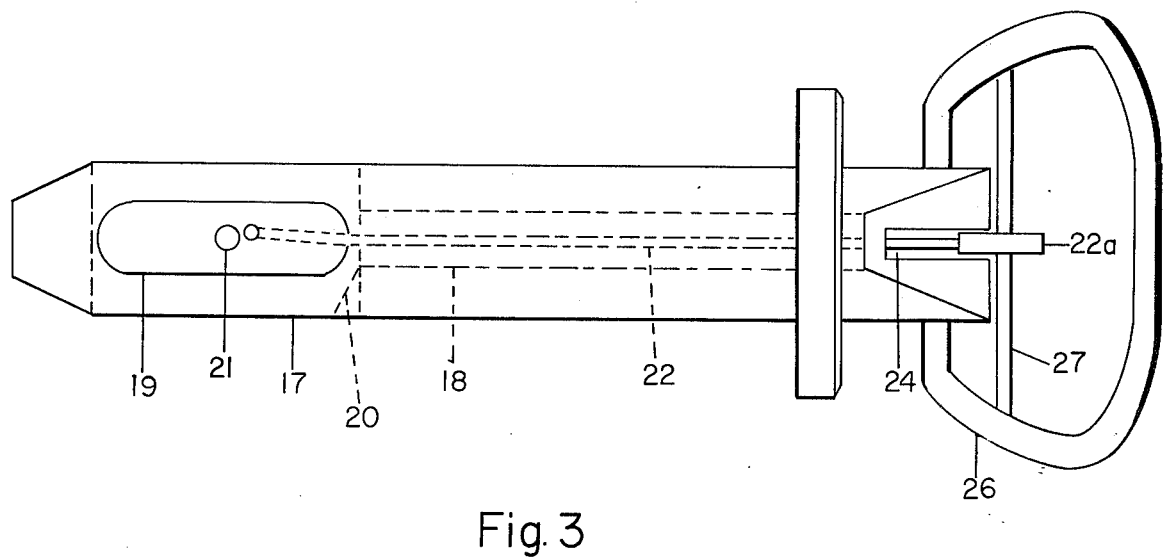
FIG. 3 is a side view similar to FIG. 1 but showing the pin in retracted position.

The means for moving the member 19 between its positions of FIGS. 1 and 3 include a control rod 22 pivotally connected at 23 to the member 19 and extending through the central bore 18. The upper end of rod 22 is formed in a transversely flattened, oval configuration, indicated at 22a, and this oval section of the rod acts as a camming portion as will subsequently be explained. The upper, tapered end of the pin body is provided with a vertical slot 24 into which the camming portion 22a may recede as shown in FIG. 2.

Pivotally supported on the upper end portion of the hitch pin body is a handle 26 which is formed in a closed loop around the upper end of the pin and lies in a plane at ninety degrees from the plane of the camming loop 22a. A transverse member 27 extends chordally across the handle and is secured at its ends to the handle, the member 27 extending through the camming portion 22a.

In operation, with the hitch pin components in their retracted position of FIG. 3, the pin may be inserted through the registering openings of, for example, a tongue and clevis hitch. As may be seen in FIG. 3, handle 26 is upright and overlies the camming loop 22a. Since, under these conditions, the transverse member 27 is in its extreme upward position, camming loop 22a and rod 22 will also be positioned at the upper limit of their movement. The rod 22 will hold member 19 in a substantially vertical position, its upper end resting against the stop abutment 20. It should be noted that in this vertical position of member 19, established by stop 20, the pivotal connection of rod 22 to member 19 is sidewardly offset from the axis 21 of pivotal motion of member 19 so that, upon subsequent downward motion of the rod 22, a dead-center condition will not exist and member 19 will be smoothly driven counter-clockwise (as viewed in FIG. 3) about its pivot 21.

After the pin has been inserted in the hitch, the handle 26 may be manually pivoted downwardly to its position of FIGS. 1 and 2 and, it will be understood, the handle may be lowered to either side of the hitch pin body. As the handle moves from its position of FIG. 3 into its position of FIGS. 1 and 2, the member 27 will move across the camming loop 22a to its end and will draw the loop downwardly into the slot 24. This lowers rod 22, pivoting member 19 about its pivot axis 21 into its locking position of FIG. 1 in which its free end portions extend beyond the slot 17 preventing withdrawal of the pin from the hitch. Release of the pin is accomplished by reverse movement of handle 26.

With the pin locked, it will be noted, the handle 26 is lowered below the tip or profile of the pin body and is generally out of the way of shearing damage or accidental, unintended release. Insertion and locking of the pin requires no handling of separate spring clips or cotter-pins and operation of the pin between its retracted and locking positions is a simple, one-step procedure.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A hitch pin having a tubular body carrying an external shoulder adjacent its upper end and having a tapered lower end adapted for insertion in registering hitch apertures, said pin body having a central vertical slot adjacent its tapered lower end, an elongated locking member pivotally supported intermediate its ends within said slot and movable between a retracted position in which the locking member is totally within said slot and a locking position in which the free end portions of the locking member extend beyond the slot, and means for moving said locking member between said positions comprising a rod pivotally connected to said locking member and extending through the central bore of said tubular pin body, the upper end of said rod having a camming portion formed in transversely flattened oval configuration, the upper end of said tubular body being provided with a vertical slot into which said camming portion of the rod recedes when said locking member is moved into its locking position, a handle member forming a closed loop pivotally attached to the pin body and disposed in a plane perpendicular to the plane of said camming portion of said rod, and a transverse member carried by said handle member extending through the camming portion of said rod, whereby as said handle member is moved into its extreme lowered position on either side of said hitching pin the handle is below the upper tip of the pin and said transverse member lowers said rod within the pin body to drive said locking member from its said retracted position to its said locking position.

* * * * *